United States Patent
Nadendla et al.

(10) Patent No.: US 12,452,200 B2
(45) Date of Patent: Oct. 21, 2025

(54) DIGITAL MESSAGE MANAGEMENT FOR A SHARED DIGITAL MAILBOX

(71) Applicant: Oracle International Corporation, Redwood Shores, CA (US)

(72) Inventors: Nagaraj Nadendla, Livermore, CA (US); Karthik Kothandaraman, Fremont, CA (US); Rajesh Choudary Gudiputi, San Ramon, CA (US); Advitya Khanna, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 73 days.

(21) Appl. No.: 18/312,770

(22) Filed: May 5, 2023

(65) Prior Publication Data
US 2024/0129269 A1    Apr. 18, 2024

Related U.S. Application Data

(63) Continuation-in-part of application No. 18/299,641, filed on Apr. 12, 2023.

(60) Provisional application No. 63/416,351, filed on Oct. 14, 2022.

(51) Int. Cl.
*H04L 51/42* (2022.01)
*H04L 51/48* (2022.01)

(52) U.S. Cl.
CPC ............. *H04L 51/42* (2022.05); *H04L 51/48* (2022.05)

(58) Field of Classification Search
CPC ........ H04L 51/42; H04L 51/48; H04L 51/216
See application file for complete search history.

(56) References Cited

U.S. PATENT DOCUMENTS

| | | | |
|---|---|---|---|
| 6,591,291 B1 | 7/2003 | Gabber et al. | |
| 10,701,051 B2 | 6/2020 | Ohsumi | |
| 11,677,878 B2* | 6/2023 | Lewinson | H04L 51/56 370/329 |
| 2002/0010799 A1 | 1/2002 | Kubota et al. | |
| 2002/0114333 A1 | 8/2002 | Xu et al. | |
| 2003/0031169 A1 | 2/2003 | Emerson | |
| 2003/0048298 A1* | 3/2003 | Ellendman | G06Q 10/107 715/752 |
| 2003/0225900 A1 | 12/2003 | Morishige et al. | |
| 2004/0078447 A1* | 4/2004 | Malik | H04L 63/102 709/206 |

(Continued)

FOREIGN PATENT DOCUMENTS

EP    0899918 A2    3/1999

*Primary Examiner* — Michael Won
(74) *Attorney, Agent, or Firm* — Invoke

(57) ABSTRACT

Techniques for managing digital messages to and from a shared mailbox are disclosed. A system receives a message directed to a shared mailbox. The system analyzes contextual data in the message to identify a set of users with access to the shared mailbox who are recipients of the message. The system performs notification operations to notify different users with access to the shared mailbox of different messages. Notification operations include sending a notification to a particular communications platform, such as email, instant message, or text, that a message in the shared mailbox is associated with the recipient, tagging the message in the shared mailbox with names of recipients associated with the message, and/or categorizing the messages in the shared mailbox according to users.

24 Claims, 8 Drawing Sheets

(56) References Cited

U.S. PATENT DOCUMENTS

| | | |
|---|---|---|
| 2004/0199595 A1 | 10/2004 | Banister et al. |
| 2004/0233916 A1 | 11/2004 | Takeuchi et al. |
| 2004/0260778 A1 | 12/2004 | Banister et al. |
| 2005/0038898 A1 | 2/2005 | Mittig et al. |
| 2007/0058658 A1* | 3/2007 | Ruckart .................. H04W 4/16 370/444 |
| 2007/0088749 A1 | 4/2007 | Lorch et al. |
| 2008/0235336 A1 | 9/2008 | Stern et al. |
| 2009/0128861 A1* | 5/2009 | Toscano ............ H04N 1/32037 358/400 |
| 2009/0150514 A1 | 6/2009 | Davis et al. |
| 2009/0177785 A1 | 7/2009 | Reid et al. |
| 2010/0070591 A1 | 3/2010 | Steuer et al. |
| 2010/0205313 A1 | 8/2010 | Boire-Lavigne et al. |
| 2010/0268804 A1 | 10/2010 | Aso et al. |
| 2010/0281535 A1 | 11/2010 | Perry et al. |
| 2011/0288962 A1 | 11/2011 | Rankin et al. |
| 2012/0204032 A1 | 8/2012 | Wilkins et al. |
| 2012/0311691 A1 | 12/2012 | Karlin et al. |
| 2013/0067012 A1 | 3/2013 | Matzkel et al. |
| 2013/0080575 A1 | 3/2013 | Prince et al. |
| 2013/0091273 A1 | 4/2013 | Ly et al. |
| 2014/0373106 A1 | 12/2014 | Morgenroth |
| 2018/0062995 A1 | 3/2018 | Naar |
| 2018/0375877 A1 | 12/2018 | Jakobsson et al. |
| 2019/0199745 A1 | 6/2019 | Jakobsson et al. |
| 2019/0325064 A1 | 10/2019 | Mathiesen et al. |
| 2020/0134566 A1 | 4/2020 | Benkreira et al. |
| 2020/0159676 A1 | 5/2020 | Durham et al. |
| 2020/0382455 A1 | 12/2020 | Fasoli et al. |
| 2020/0409981 A1* | 12/2020 | Kadatoka ................ H04L 51/00 |
| 2021/0350328 A1 | 11/2021 | Benkreira et al. |
| 2021/0399983 A1 | 12/2021 | Blatt |
| 2021/0406836 A1 | 12/2021 | Bar-On |
| 2022/0400096 A1 | 12/2022 | Freed |
| 2023/0155978 A1 | 5/2023 | Thubert et al. |
| 2024/0129264 A1* | 4/2024 | Nadendla ................ H04L 51/42 |

\* cited by examiner

DIGITAL MESSAGE MANAGEMENT FOR A SHARED DIGITAL MAILBOX

INCORPORATION BY REFERENCE; DISCLAIMER

Each of the following applications are hereby incorporated by reference: application Ser. No. 18/299,641 filed on Apr. 12, 2023; application No. 63/416,351 filed on Oct. 14, 2022. The applicant hereby rescinds any disclaimer of claims scope in the parent application(s) or the prosecution history thereof and advise the USPTO that the claims in the application may be broader than any claim in the parent application(s).

TECHNICAL FIELD

The present disclosure relates to managing the digital messages for a shared mailbox. In particular, the present disclosure relates to analyzing message content, including metadata and content within a message, to identify users with access to a shared mailbox who are intended recipients of the message.

BACKGROUND

Enterprises use generic email boxes to send messages to customers and to receive messages from customers. Typically, one or more users having permission may view messages in the generic email box. However, an email box receives a large volume of emails, it may be difficult for users to determine which emails apply to them. Users may miss opportunities or anger customers by failing to respond to emails in a timely manner. In addition, when users receive large volumes of emails, the user may find it difficult to remember the context associated with a particular email. For example, a recruiter may be dealing with ten different candidates, four active clients, and twenty or more opportunities associated with other recruiters or an entire recruiting firm. When reading candidate emails, the recruiter may find it difficult to remember a particular candidate's qualifications or a particular position's requirements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
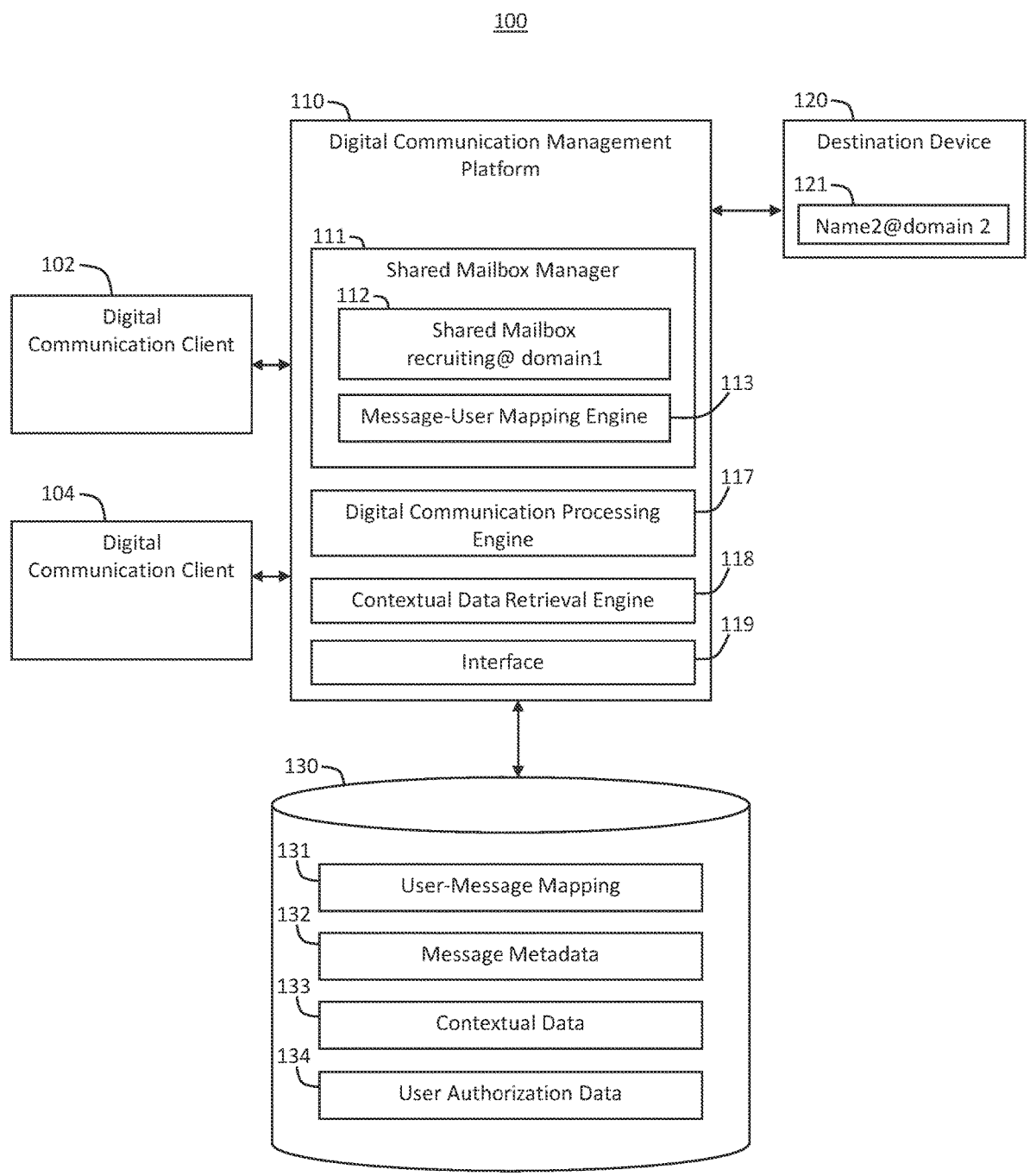
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. ANALYZING DIGITAL MESSAGE CONTENT TO MANAGE USER-MESSAGE MAPPING OPERATIONS IN A SHARED MAILBOX
4. EXAMPLE EMBODIMENTS
5. COMPUTER NETWORKS AND CLOUD NETWORKS
6. MISCELLANEOUS; EXTENSIONS
7. HARDWARE OVERVIEW

1. General Overview

One or more embodiments include a digital message management platform for providing contextual notifications and/or display of messages in a shared mailbox. The digital message management platform manages 1 to n and n to n communication, incorporating a shared mailbox for uniform messaging, user privacy, and message management. For example, users may send messages from the email address of the shared mailbox and may receive messages in the shared mailbox. When a message is received at the address associated with the shared mailbox, the digital message management platform identifies one or more recipients with access to the shared mailbox based on contextual data determined from the message, message metadata, and/or a source of the message. The system may perform a notification operation such as (a) sending a notification to a particular communications platform, such as email, instant message, or text, that a message in the shared mailbox is associated with the recipient, (b) tagging the message in the shared mailbox with names of recipients associated with the message, and/or (c) categorizing the messages in the shared mailbox according to users. For example, the shared mailbox may include separate headers for each user with access to the shared mailbox. The system may display under each header the messages that the system has determined to be relevant to the particular user. In addition, or in the alternative, users may access email messages via a particular application. The particular application may access the shared mailbox and display for the user only the messages from the shared mailbox that are associated with the particular user. The system may display the shared mailbox so as to hide messages determined to be associated with other users and to which a particular user does not have viewing authority.

Identifying the appropriate recipient(s) from the set of users for contextual display, notification, and routing may include identifying the initial user that sent an outbound message, identifying users that were included in an initial outbound message, identifying users that may contribute to a conversation, and/or identifying users that the system determines should be copied on a conversation based on an inclusion criterion.

According to one or more embodiments, contextual data used for displaying and routing messages and generating user notifications may include, for example, personal information about the author of the reply message and information regarding matters the author of the reply message is associated with.

In one or more embodiments, the digital message management platform augments inbound and/or outbound messages with supplemental information that may be helpful to a recipient of a message. In an example, the digital message management platform forwards a message from a candidate to a recruiter. Prior to forwarding the message, the digital message management platform queries a database for hiring manager notes related to the candidate. The system appends the notes to the message prior to forwarding the message to the recruiter. The recruiter is then able to process and/or respond to the candidate's message in view of the hiring manager notes.

According to one or more embodiments, the system generates a display of a shared mailbox based on generating a user-message mapping of messages addressed to the shared address. For example, the system may display a set of messages in the shared mailbox mapped to different users. The system may generate and display tags identifying which users or sets of users are mapped to respective messages. When a user logs in to an application to view the shared mailbox, the user may view the set of messages with the associated tags to differentiate messages mapped to the user from messages mapped to other users. According to one or more embodiments, displaying the shared mailbox based on the user-message mapping includes grouping messages in a display according to the users mapped to the messages. The system may group a first set of messages mapped to one user in one region of a display. The system may map a second set of messages mapped to another user in another region of the display. Each region may include a header or tag identifying the user mapped to the messages. When a user logs in to an application to view the shared mailbox, the system may display the user's mapped messages in a prominent location on a display, such as at a top of a display of a shared mailbox, while displaying messages mapped to other users in less-prominent positions. When another user logs in to the application to view the same shared mailbox, the system may present their mapped messages in the prominent position, such as at the top of the display, while displaying messages mapped to other users in less-prominent positions. According to one or more embodiments, displaying the shared mailbox based on the user-message mapping includes displaying in a GUI of a local instance of an application messages mapped to a user logged in to the local instance of the application, while refraining from displaying messages mapped to other users. For example, each user may log in to respective local client applications to access a shared mailbox maintained in a cloud environment. When a particular user logs in to a particular local client application, the system refers to a user-message mapping for messages in the shared mailbox to identify a set of messages mapped to a particular user. The system sends to the local client application the particular set of messages mapped to the particular user, without sending messages mapped to other users.

One or more embodiment present sets of messages in a GUI associated with a particular user based on (a) a user-message mapping, and (b) an authorization level of the particular user. For example, a first user with a low authorization level may log in to an application to access a shared mailbox. The system refers to a user-message mapping to identify a set of messages mapped to the user and sets of messages mapped to other users. The system displays in the application the set of messages mapped to the user. The system further determines that, based on the user's low authorization level, the user is not permitted to view, access, open, or respond to messages mapped to other users. Accordingly, the system prevents the user from viewing, accessing, opening, or responding to messages mapped to the other users. A second user with a high authorization level may log in to the application to access the shared mailbox. Based on the user's high authorization level, the system displays both a set of messages mapped to the second user and additional sets of messages mapped to additional users.

One or more embodiments provide for selectively anonymizing messages by the digital message management platform. For example, a user may generate a message to an outside address. The message generation graphical user interface (GUI) may include radio buttons to show/hide the source sender name. For example, a user may select a radio icon to omit the user's name from the "From" and "Subject" fields of an email message. If the user makes a selection to include the user's name, the system may provide the user's name together with an address of the shared mailbox, such as "Chris L. <recruiting@domain1.xyz>". In addition, the message generation GUI may include radio buttons to show/hide the source sender name from a body of a message, such as a signature. When the system detects a particular user has generated a message from the shared mailbox address, the system may include a signature at a bottom of the message which includes the user's name. If the user selects an interface element to omit their name from the body of the message, the system may refrain from including the signature at the bottom of the message.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a digital communication management platform 110 and a data repository 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

One or more digital communication clients 102, 104 communicate with the digital communication management platform 110 to transmit and receive digital messages, such as electronic mail (email). The digital communication management platform 110 transmits digital messages to, and receives digital messages from, one or more destination devices 120. For example, a user may log in to an instance of a digital communication messaging application on the client 102 to access the shared mailbox manager 111. The user may access the shared mailbox manager 111 via an interface 119. The interface 119 may include, for example, an application programming interface (API) which allows the user to interact with the shared mailbox manager 111 to (a) generate messages to the destination device 120, and (b) view, edit, delete, and respond to messages stored in the shared mailbox 112. A user associated with the digital message address 121 may access the destination device 120 to send a digital message to an address (e.g., "recruiting@domain1.xyz") corresponding to the shared mailbox 112.

According to one or more embodiments, clients 102 and 104 are associated with one or more devices, such as personal computers, laptops, or mobile devices. For example, a user may provide a user identification to open an application at a workstation to access a cloud-based digital communication management platform 110 managed in-house by an enterprise. In addition, or in the alternative, the user may access the digital communication management platform 110 by entering a uniform resource locator (URL) into a web browser from any one of a personal computer, a laptop, and a mobile phone. In addition, or in the alternative, the digital communication management platform 110 may be implemented, at least in part, as an application downloadable onto a client device. A user may interface with the application to send and receive messages. The application may communicate with cloud-based resources to perform functions for transmitting, receiving, storing, and analyzing digital messages.

The digital communication management platform 110 includes the shared mailbox manager 111, a digital communication processing engine 117, a contextual data retrieval engine 118, and the interface 119. In one or more embodiments, interface 119 refers to hardware and/or software configured to facilitate communications between a user and the digital communication management platform 110. Interface 119 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 119 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 119 is specified in one or more other languages, such as Java, C, or C++.

According to one embodiment, the interface 119 includes graphical user interface elements that allow users to selectively anonymize messages. For example, a user may select an icon of a GUI when generating a message to direct the shared mailbox manager 111 to show the user's name together with the address of the shared mailbox 112 or to omit the user's name from the message. The interface 119 may provide to the client 102 a GUI including radio buttons, selectable by the user, to show/hide the source sender name.

The shared mailbox manager 111 stores messages associated with one or more shared mailboxes 112. In the embodiment illustrated in FIG. 1, the shared mailbox 112 is a recruiting mailbox associated with an address "recruiting@domain1.xyz." However, a shared mailbox may be any mailbox accessible by multiple different users for sending and receiving electronic messages, such as a customer support mailbox, an information mailbox, and a sales mailbox. Different departments within an enterprise may be associated with different shared mailboxes. For example, a recruiting department may be associated with a recruiting mailbox. Each recruiter may access messages in the shared mailbox. A legal department may maintain a legal mailbox. Each member of the legal department may access messages in the legal mailbox. However, a recruiter may not have access to the legal mailbox, and an attorney may not have access to the recruiting mailbox The shared mailbox manager 111 includes a message-user mapping engine 113. A digital communication processing engine 117 analyzes received digital communications to identify content within the communications and/or metadata transmitted with, or associated with, the communications. For example, the message content may include a matter identification number within the text of a message, a name within the text of the message. Metadata may include a timestamp associated with the message, a source address (such as email address) from which the message was sent or an IP address or MAC address associated with a device from which the message was sent. Metadata may include a data file that is not visible within the message which includes data associated with the message. For example, the metadata may identify a sender of the message, an address of the sender, an addressee of the message, a priority of the message, and time data associated with the message. The message-user mapping engine 113 maps messages to users based on the content identified by the digital communication processing engine 117.

According to one or more embodiments, the message-user mapping engine 113 performs a targeted notification action based on the mapping of messages to users. For example, the shared mailbox manager 111 may cause the clients 102 and 104 to display a GUI presenting a set of messages in the shared mailbox 112 and tags identifying users mapped to the set of messages. In addition, or in the alternative, the shared mailbox manager 111 may cause the clients 102 and 104 to display a GUI presenting a set of messages in the shared mailbox 112 sorted according to a user-message mapping 131. For example, a user accessing the shared mailbox 112 via the client 102 may be presented with a GUI in which the messages mapped to the user are in an upper region of a display, and messages mapped to other users are in lower regions of the display. Another user accessing the shared mailbox 112 via the client 104 may be presented with a GUI in which the messages mapped to them are displayed in the upper region, while messages mapped to other users (including the user associated with the client 102) are located in lower regions of the display.

According to one or more embodiments, applications running on the clients 102 and 104 present only messages mapped to the particular user logged in to the client. For example, when a first user logs in to the digital communication management platform 110 from the client 102, the shared mailbox manager 111 causes the client 102 to display a first set of messages from the shared mailbox 112 mapped to the first user. When a second user logs in to the digital communication management platform 110 from the client 104, the shared mailbox manager 111 causes the client 104 to display a second set of messages from the shared mailbox 112 mapped to the second user.

According to one or more embodiments, the message-user mapping engine 113 re-routes one or more messages addressed to the shared mailbox 112 to a particular address associated with a particular user. For example, the system may map an email message directed to the shared mailbox 112 to the user Jane T. based on a subject line of the message indicating a particular matter number that is mapped to the user Jane T. The message-user mapping engine 113 re-routes the email message from the shared email address to Jane T.'s email address.

According to one or more embodiments, the message-user mapping engine 113 performs the targeted notification of users based, in part, on access authority levels of the users. For example, a shared mailbox manager 111 may display for each user who logs in to a digital message management platform all the messages in a shared email box. The messages may be tagged and/or sorted according to a user mapping of messages to users. The shared mailbox manager 111 may allow a user to open and/or act on messages mapped to the user. The shared mailbox manager 111 may prevent a user from opening and/or acting on messages that are not mapped to them. For example, if the system determines based on message metadata that a message is mapped to a user Chris L., the system permits Chris L. to open, read, and respond to the message. The shared mailbox manager 111 prevents another user, Jane T., from opening, reading, and responding to the message. In addition, or in the alternative, the shared mailbox manager 111 may access user authorization data 134 to selectively prevent users from opening and/or acting on messages that are not mapped to them according to the user's access authority level.

A contextual data retrieval engine 118 identifies contextual data 133 associated with a digital message based on the message content and/or metadata associated with the message. For example, the contextual data retrieval engine 118 may retrieve employment opportunities, resumes, and related documentation associated with an employment candidate based on identifying the employment candidate as the sender of a digital message. The shared mailbox manager 111 may present in a GUI, together with the digital message in the shared mailbox 112, the contextual information.

In one or more embodiments, the digital communication management platform 110 refers to hardware and/or software configured to perform operations described herein for receiving digital communications, analyzing content of the digital communications, identifying contextual data associated with the digital communications, and generating digital communications. Examples of operations for managing mappings of users and messages in a shared mailbox are described below with reference to FIGS. 2A and 2B and FIG. 3.

In an embodiment, the digital communication management platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Additional embodiments and/or examples relating to computer networks are described below in Section 6, titled "Computer Networks and Cloud Networks."

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the digital communication management platform 110. Alternatively, or additionally, a data repository 130 may be implemented or executed on a computing system separate from the digital communication management platform 110. A data repository 130 may be communicatively coupled to the digital communication management platform 110 via a direct connection or via a network.

Information describing user-message mapping 131, message metadata 132, and contextual data 133 may be implemented across any of components within the system 100. However, this information is illustrated within the data repository 130 for purposes of clarity and explanation.

In one or more embodiments, a tenant (such as client 102 and/or client 104) is a user associated with a corporation, organization, enterprise or other entity that accesses a shared computing resource, such as the digital communication management platform 110.

3. Analyzing Digital Message Content to Manage User-Message Mapping Operations in a Shared Mailbox FIGS. 2A and 2B illustrate an example set of operations for managing operations associated with mapping users to messages in a shared mailbox in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

A system detects generation of a message, from a user with access to a shared mailbox, directed to an external address (Operation 202). The system identifies the user generating the email based on metadata associated with the message. For example, each user may log in to a message-generating application with a unique user ID. The system may detect which user has generated a digital message based on the user ID.

For example, a company may maintain a shared mailbox accessible by multiple employees for generating and receiving emails to and from external addresses. One shared email box may be for a particular department, such as "legal@companyname.xyz." Another shared email box may be for general inquiries, such as "info@companyname.xyz." According to another example, a recruiting department shares a mailbox "recruiting@companyname.xyz." Multiple different recruiters may generate emails using the shared email box. Similarly, applicants may send emails to the shared email box that may be the responsibility of a particular recruiter. In an example embodiment in which the shared mailbox is managed in a cloud environment, users may log in to a software platform associated with one or more servers in the cloud environment from a desktop computer or other computer. The platform may provide the user with a graphical user interface (GUI) for generating and/or receiving messages using the shared mailbox.

The system determines whether a user has selected address anonymization for the message (Operation 204). For example, the system may provide the user with a GUI including selectable radio buttons to show/hide the user's identity. The selections to show/hide the user's identity may be selected by a user when generating a message or stored in predefined settings for the system to apply to any messages generated within a particular electronic messaging application.

According to one or more embodiments, the system determines whether display the user's identity, such as the user's name, together with the shared email address, by determining that the user's ID is associated with a particular anonymization setting. According to one example, the system determines anonymization settings based on how a user accesses a cloud-based mailbox management platform. If a user accesses the cloud-based mailbox management platform from an email application in a web browser, or an email service associated with an office application suite of applications, the system may refrain from displaying the user's name together with the shared email address. On the other hand, if the user generates and transmits a message using an application or browser plugin associated with a the mailbox management platform, the system may display the user's name together with the shared email address when sending the generated message to an external address. According to yet another example embodiment, account configuration settings may specify that the system should display a user's name together with a shared email address when an email is directed to an address in one set of addresses, and the system should not display the user's name together with a shared email address when an email is directed to any other address. The account configuration settings may specify that the system should display the user's name together with a shared email address when a user selects a particular icon on a GUI, and the system should not display the user's name together with a shared email address when the user does not select the icon.

Based on detecting a selection to anonymize the an email message, the system refrains from displaying a user's name together with a shared email address (Operation 206). For example, if a user generates a message from a shared mailbox with an address recruiting@domain1.xxy, the system does not include the user's name in an address field when sending the message to an external address. In addition, if the user's mail-generating settings are configured to include a signature with the user's name, the system may omit the signature from the message to the external address.

Based on detecting a selection to not anonymize the an email message, the system inserts a user's name into a heading portion of a digital message, together with a shared email address (Operation 208). For example, if a user generates a message from a shared mailbox with an address recruiting@domain1.xxy, the system may display the user's name as a hyperlink to the shared email address. For example, the "From:" field of the digital message may be displayed as "From: Chris W." If a recipient selects "Chris W." via a graphical user interface (GUI), the GUI may display the digital message address: "recruiting@domain1.xxy" According to another example, the system may display the "From:" field as "From: Chris W. <recruiting@domain1.xxy>". In addition, if the user's mail-generating settings are configured to include a signature with the user's name, the system may permit the signature to be included in the message to the external address.

The system stores user ID data in connection with the message (Operation 210). For example, if the message does not include a user name or user ID in the "From" field, in a heading, or in the body of the message, the system may store a user name and/or user ID associated with the user that generated the message as metadata in a digital file attached to the message. The metadata is not displayed in an address line of the message or in the content of the message.

The system transmits the message to the external address, with the shared mailbox address displayed as the source address of the message (Operation 212). In an example in which the digital message is an email address, the system lists the shared mailbox address in the "From:" field and the external address in the "To:" field.

Figure 3:
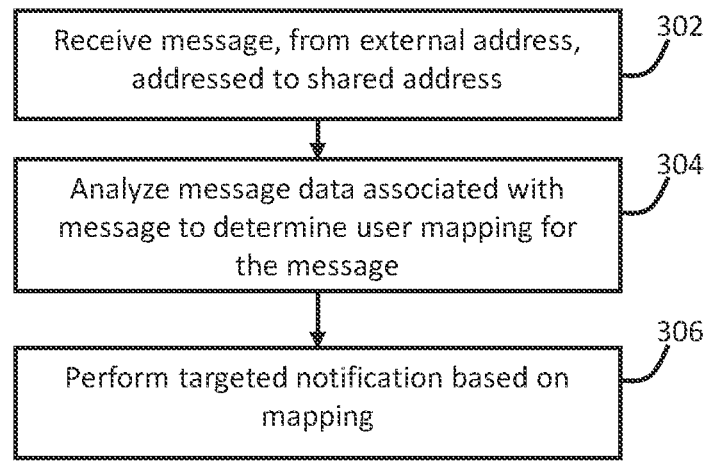
FIG. 3 illustrates an example set of operations for performing directed operations based on mapping messages in a shared mailbox to particular users in accordance with one or more embodiments.

Referring to FIG. 3, the system receives a message, addressed to the shared mailbox address, from an external address (Operation 302).

The system analyzes the received message to perform contextual user mapping for the message (Operation 304). Specifically, the system identifies contextual data to identify a set of users associated with the message. According to one embodiment, the system identifies the message as a reply to a message generated by a particular user whose identity is not included in the message header (e.g., the "To", "From", and "Subject" fields) or in the body of the message, such as in a signature of the message. The system may analyze stored metadata associated with the replied-to message to identify the source user who generated the message. For example, a user may log in to a digital message management application to generate messages from a shared digital message mailbox, and to retrieve messages from the shared digital message mailbox. The system may store metadata mapping the a user ID to a message ID. The system may transmit the message ID with the message to the external address. Upon receiving a response message, the system detects the message ID in the response and maps the message ID to the user who generated the initial message. According to another example embodiment, the system stores a user ID as metadata associated with a sent message.

According to yet another embodiment, the system analyzes message content, such as a matter ID number included in the message content, to identify one or more users associated with the message. For example, a subject of a message may include the text: "Re: Matter: ZZXX11 Employment Opportunity." The system may identify matter ZZXX11 as being associated with two users: Abigail and Christine. The system maps the message to the two users for subsequent targeted actions.

The system performs a targeted notification action based on the user mapping (Operation 306). For example, the system may generate a tag associated with one or more users mapped to a message in a shared mailbox. Based on the tag, the system may perform one or more operations including: displaying user names corresponding to messages in a GUI displaying the shared mailbox, grouping messages by users in a GUI displaying a shared mailbox, and displaying messages mapped to a user in the user's display when the user logs in to a digital message management platform that maintains the shared mailbox.

According to one or more embodiments, the system displays one or more user names together with corresponding messages in a shared mailbox. When a user runs an application to access messages in the shared mailbox, the system displays messages mapped to multiple different users. The system displays which messages are mapped to particular users by displaying the user's name. For example, a set of displayed messages may include messages mapped to two separate users, and a message mapped to all users (or a message that is not mapped to any particular group of users). The system displays the name for user A next to one message, the name for user B next to another message, and the word "All Users" next to a third message.

According to one or more embodiments, the system sorts a display of a shared mailbox to display particular sets of messages mapped to particular users. For example, the system may display one group with a header "Chris L." The system may display a set of messages beneath the header including: messages mapped only to Chris L. (such as replies to messages generated by Chris L.), messages mapped to a group of users including Chris L., and messages mapped to all users. The system may display another group with a header "Jane T." The system may display a set of messages beneath the header including: messages mapped only to Jane T., messages mapped to a group of users including Jane T., and messages mapped to all users. If a message is mapped to a group of users including both Chris L. and Jane T., the system may display the message in the groups associated with both users. When a user reads and/or responds to a message, the system may change a visual representation of the message, such as by changing a style of font or a shade of an outline of the message. If a message is mapped to multiple users, the system may change the visual representation of the message in each user's message section (or, in other words, a section of a GUI where the user's messages are displayed). For example, if the system displays the same message in a section associated with Chris L. and in a section associated with Jane T., and if Chris L. reads the message, the system may change the visual representation of the message in the sections associated with both Chris L. and Jane T. In addition, if one user accesses and/or responds to a message mapped to two or more users, the system may display information indicating who performed an action associated with the message. For example, if Chris L. responds to a message mapped to both Chris L. and Jane T., the system may (a) change a visual representation of the message in Chris L.'s message section by dimming an outline of the message, and (b) change a visual representation of the message in Jane T.'s message section may dim the outline of the message and also generating a text notification that "Chris L. responded to this message." In another example, the system may delete a message from users' message sections based on determining that another user has taken an action associated with the message. For example, if Chris L. responds to a message mapped to both Chris L. and Jane T., the system may (a) change a visual representation of the message in Chris L.'s message section by dimming an outline of the message, and (b) remove a visual representation of the message from Jane T.'s message section.

According to one or more embodiments, the system sorts messages in a shared mailbox by storing messages in particular folders corresponding to different users and/or groups of users. For example, a mailbox may include a folder for "Chris L.", another folder for "Jane T.", another folder for "Recruiting Team", and another folder for "All".

According to one or more embodiments, the system stores messages in the shared mailbox and generates notifications to particular users based on identifying messages mapped to the particular users. For example, the system may determine based on metadata that a message directed to the shared mailbox address is mapped to Jane T. only. The system may generate a notification for Jane T. to notify Jane T. of the message in the shared mailbox. The system may refrain from generating notifications to other users with access to the shared mailbox. For example, if both Chris L. and Jane T. send and receive messages via the shared mailbox, the system may refrain from sending a notification to Chris L. when it detects, based on message metadata or other contextual information, a message mapped to Jane T. and not to Chris L. Similarly, the system may send a notification only to Chris L., and refrain from sending a notification to Jane T., based on detecting that a message sent to the shared mailbox is associated with Chris L. and not with Jane T. The system may send a notification to both Chris L. and Jane T. based on detecting that a message sent to the shared mailbox is mapped to either (a) both Chris L. and Jane T., or (b) all users with access to the shared mailbox. Sending a notification may include sending a message via an alternative messaging service. For example, if the mailbox is an electronic mail (email) mailbox, the system may generate a message via an instant messaging application or text messaging application. In addition, or in the alternative, the system may generate a notification in a client version of the shared mailbox management platform. For example, the shared mailbox management platform may include cloud-based storage and message management. The platform may also include clients that are downloaded onto user devices, such as portable electronics devices and desktop computers. The client applications may allow users to log in to the cloud-based services, generate messages from the shared mailbox address, and view messages sent to the shared mailbox address. Generating the notification may include generating an icon and/or message in a portion of a visual display corresponding to the client application of the shared mailbox management platform.

According to one or more embodiments, users access messages stored in a shared mailbox via an application client stored on a local device. A shared mailbox management platform may include cloud-based storage for storing the messages in the shared mailbox. Users access the cloud-based messages by logging in to application clients running on local devices. The system displays subsets of messages from the shared mailbox on the users' application clients based on the user mappings for the messages. For example, when one user, Chris L. logs in to an application client using Chris L.'s login information, the system displays a subset of messages on the application client interface, including messages (a) mapped to Chris L. and (b) mapped to all users with access to the shared mailbox. When another user, Jane T. logs in to an application client using Jane T.'s login information, the system displays a subset of messages on the application client interface, including messages (a) mapped to Jane T. and (b) mapped to all users with access to the shared mailbox. The system refrains from displaying messages mapped to Chris L.

According to one or more embodiments, the system re-routes messages, addressed to the shared mailbox, to a particular address of a particular user based on determining the message is mapped to the particular user. For example, the system may map an email message directed to the shared email box to the user Jane T. based on a subject line of the message indicating a particular matter number that is mapped to the user Jane T. The system re-routes the email message from the shared email address to Jane T.'s email address. According to one embodiment, the system forwards a copy of the message to Jane T. while leaving the original message in the shared email box. According to an alternative embodiment, the system re-routes the email message to Jane T.'s email address without storing the original message in the shared email box.

According to one or more embodiments, the system performs the targeted notification of users based, in part, on access authority levels of the users. For example, a system may display for each user who logs in to a digital message management platform all the messages in a shared email box. The messages may be tagged and/or sorted according to a user mapping of messages to users. The system may allow a user to open and/or act on messages mapped to the user. The system may prevent a user from opening and/or acting on messages that are not mapped to them. For example, if the system determines based on message metadata that a message is mapped to a user Chris L., the system permits Chris L. to open, read, and respond to the message. The system prevents another user, Jane T., from opening, reading, and responding to the message. In addition, or in the alternative, the system may selectively prevent users from opening and/or acting on messages that are not mapped to them according to the user's access authority level. For example, a user with a higher access authority level may be permitted to access messages in the shared mailbox that are mapped to other users. A user with a lower access authority level may be prevented from accessing messages in the shared mailbox that are mapped to other users. According to one or more embodiments, the system alters a display of messages in the shared mailbox according to access authority levels of users. For example, a user with a higher access authority may be able to see more messages in the shared mailbox than another user with a lower access authority. According to one example in which the system groups messages according to the users to which the messages are mapped, a user with a higher authority level may be able to see the messages in display regions corresponding to messages of other users. A user with a lower authority level may be prevented from viewing messages in display regions corresponding to messages of other users.

According to one or more embodiments, the system identifies contextual data associated with a message sent to the shared mailbox. For example, the system may identify, based on an external address ggpyz@domain3.xxy, a user associated with the external address. The system may identify documents previously submitted by the user, such as a resume, employment cover letter, or application. The system may identify employee-generated data, such as customer support tickets, notes regarding qualifications or interviews, or any other employee-generated data stored in connection with the user. The system may generate a link to the contextual data in a user interface displaying the message. In addition, or in the alternative, the system may include documents as attachments attached to the message in the shared mailbox. In addition, or in the alternative, the system may include a hyperlink in the content of the message that directs an employee to the contextual data, such as a previously-submitted application.

According to one or more embodiments, the system includes files or links to data associated with the external email address. For example, when a job applicant responds to a message, the system may modify the response to include a link to the applicant's profile associated with the external address. In addition, or in the alternative, the system may attach a data file, such as a resume in the case of a job applicant, to the message prior to sending the message to the target user. The system may modify the content of the message in the shared mailbox to include identifying information associated with an external address from which the message originated. The identifying information may include, for example, a name of a user associated with the external email address and a matter associated with the user.

Figure 2:
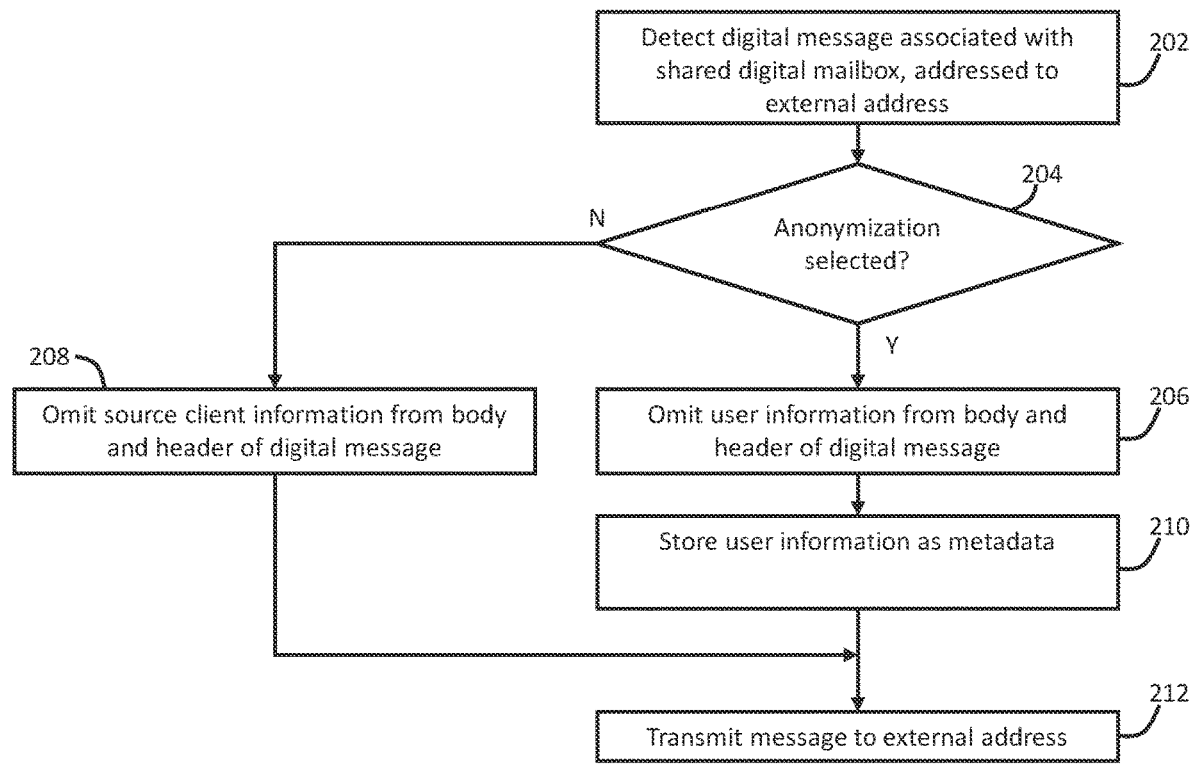
FIG. 2 illustrates an example set of operations for managing anonymity of digital messages via a shared mailbox in accordance with one or more embodiments.

As described in FIGS. 2 and 3, a system manages digital messages transmitted to and from a shared mailbox. The system maps messages directed to the mailbox to one or more users with access to the mailbox. The system performs directed notification operations based on the mapping, including: tagging messages in a shared mailbox according to user, sorting messages in the shared mailbox, and selectively displaying messages to different users. The system further identifies and provides contextual data associated with messages to users accessing messages in the shared mailbox.

4. Example Embodiments

Figure 4:
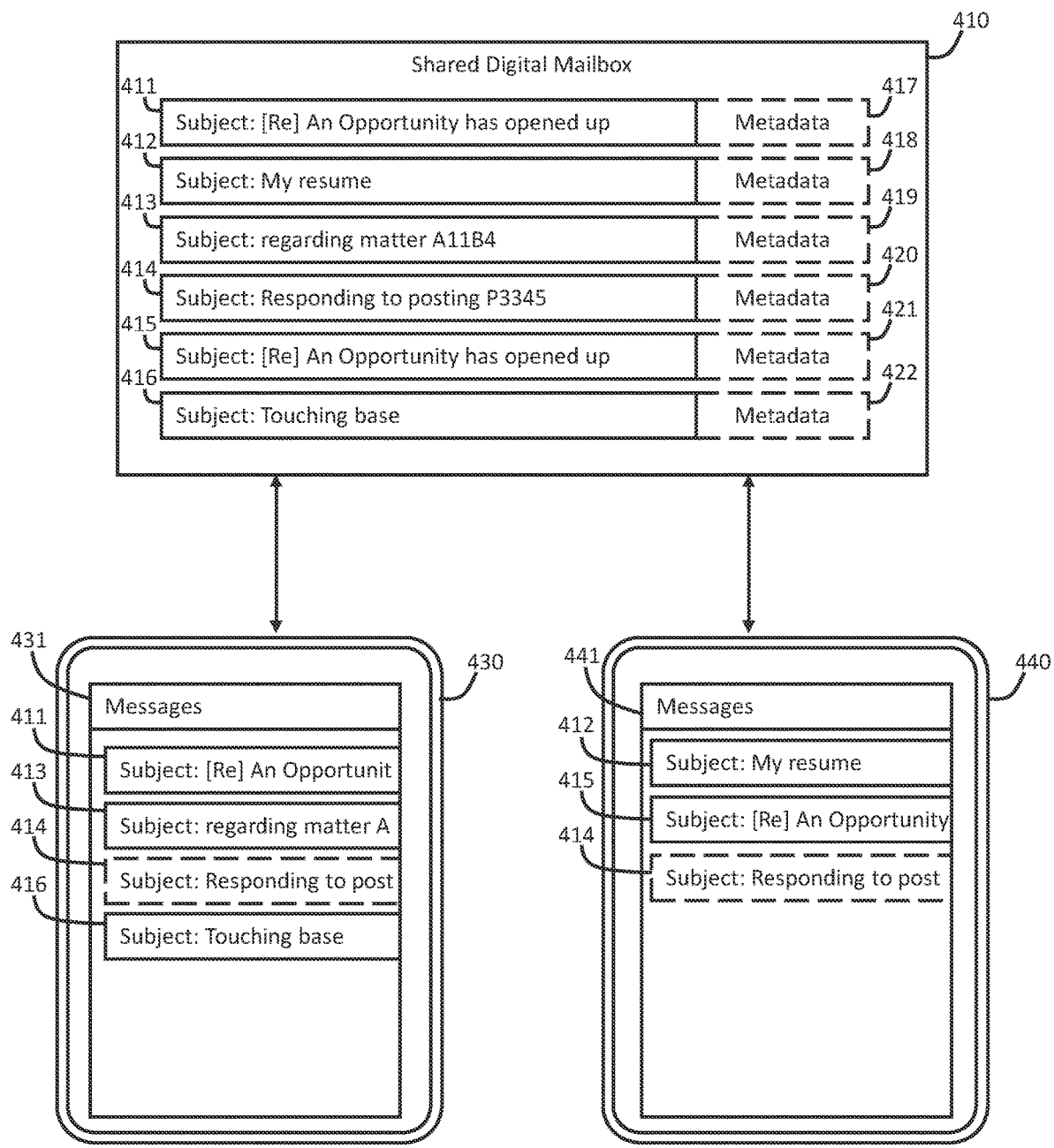
FIGS. 4-6 illustrate example embodiments.
Figure 5A:
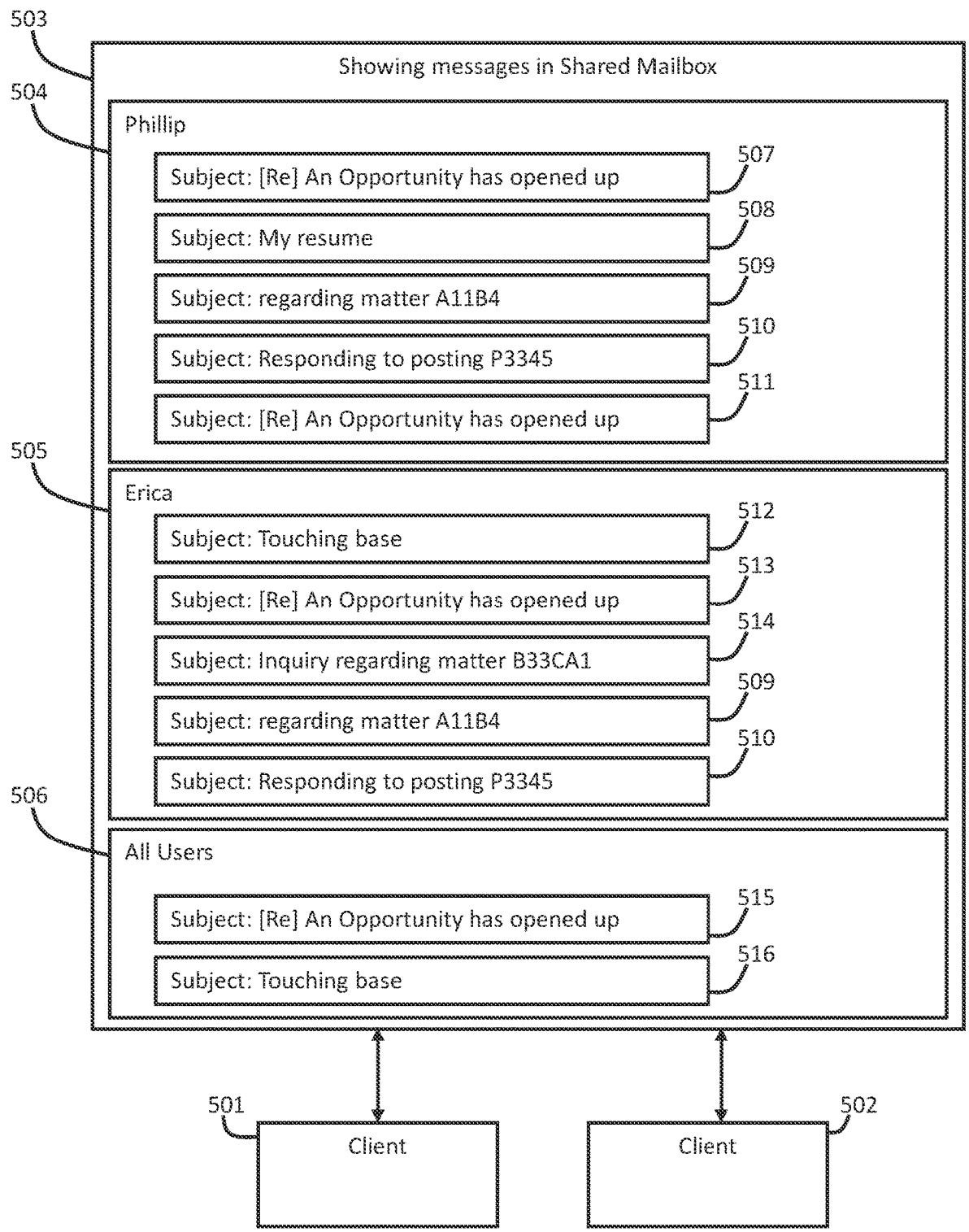
Figure 5B:
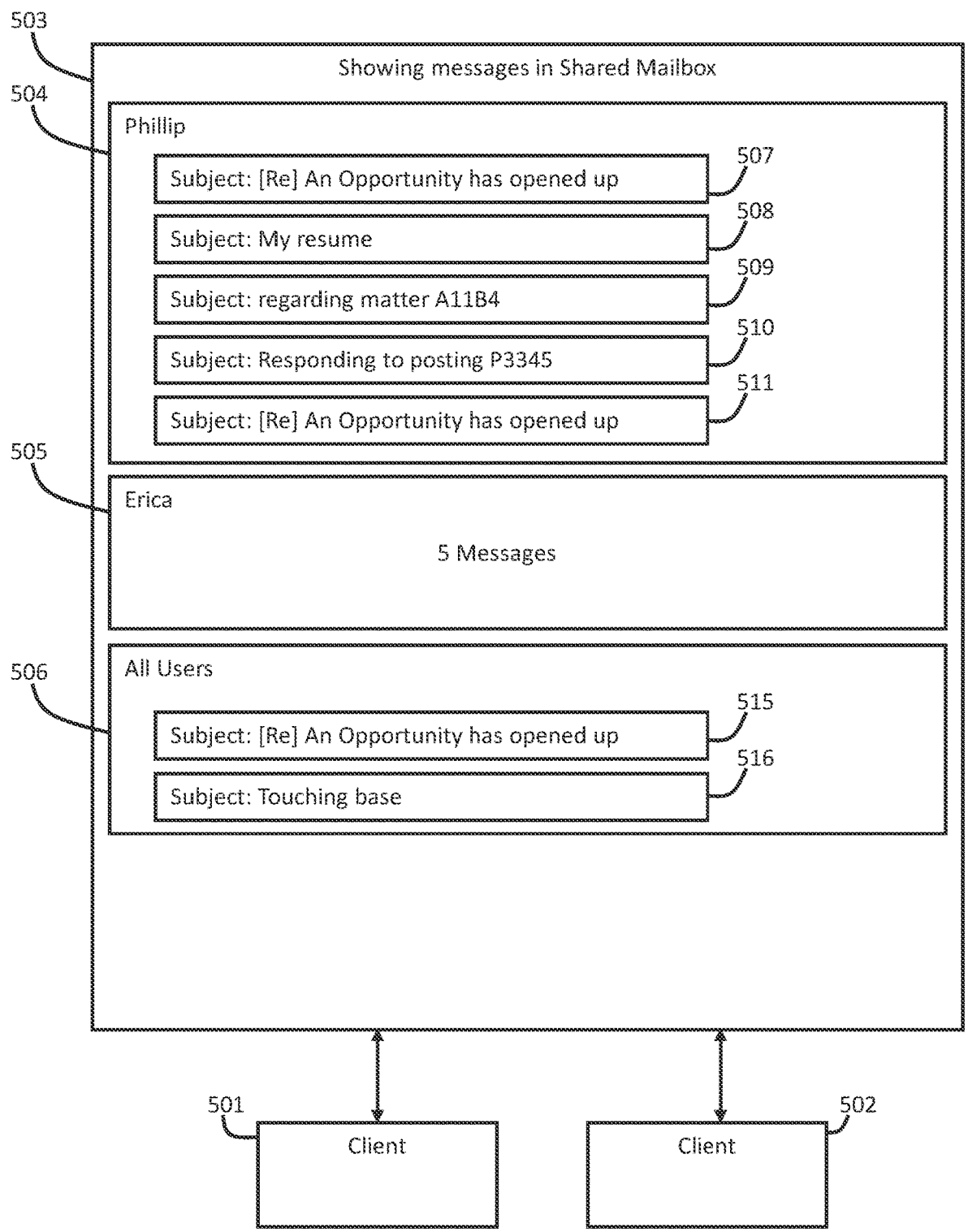
Figure 6:
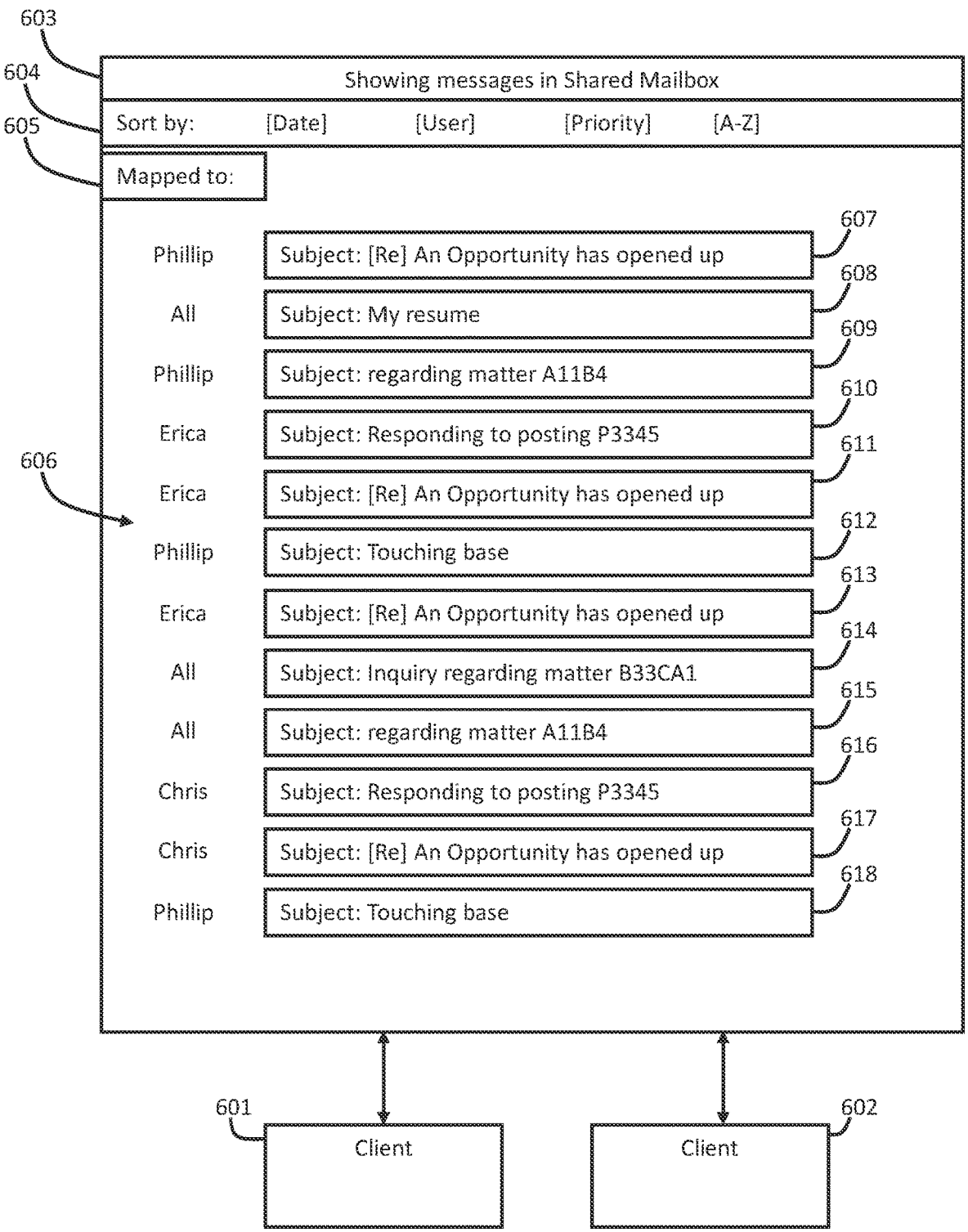

FIGS. 4-6 illustrate example embodiments of analyzing message data to manage message classification operations. Features illustrated in FIGS. 4-6 may be modified, rearranged, or omitted all together. Accordingly, the particular features illustrated in FIGS. 4-6 should not be construed as limiting the scope of one or more embodiments.

FIG. 4 illustrates an example embodiment in which users access messages stored in a shared mailbox via an application client stored on a local device. Device 430 runs an instance of a digital message management application. A user logs into the instance of the application on the device 430 to access, read, and generate messages in a shared digital mailbox 410. The shared digital mailbox 410 is maintained by a digital communication management platform (such as the platform 110 illustrated in FIG. 1) running on one or more servers in a cloud environment. The digital message management platform is accessible via a communications network by multiple different users running multiple different instances of a digital message management application on different devices. The application running on the device 430 generates a graphical user interface (GUI) including a "Messages" window 431. The application displays a set of messages 411, 413, 414, and 416 in the Messages window 431.

The digital communication management platform running in the cloud environment analyzes contextual data in the messages to map messages to users. For example, the digital communication management platform maps the message 411 to a first user based on the metadata 417. Likewise, the digital communication management platform maps messages 413 and 416 to the first user based on the metadata 419 and 422. The digital communication management platform maps messages 412 and 415 to a second user based on the metadata 418 and 421. The digital communication management platform maps message 414 to both the first user and the second user based on metadata 420.

When the first user logs into the application on the device 430, the digital communication management platform provides the messages 411, 413, 414, and 416 to the application to display on the GUI based on the mapping of the messages 411, 413, 414, and 416 to the first user. When the second user logs into the application on the device 440, the digital communication management platform provides the messages 412, 415, and 414 to the application to display in a "Messages" window 441 of the GUI based on the mapping of the messages 412, 415, and 414 to the second user.

According to the example embodiment illustrated in FIG. 4, a system selectively presents subsets of messages from a shared mailbox 410 to different instances of an application running on different devices according to a mapping of users to messages.

Referring to FIGS. 5A and 5B, clients 501 and 502 are computing devices—such as portable computing devices or personal computers—that access a digital communication management platform to view, read, and generate messages in a shared mailbox. Window 503 represents a GUI displayed by the client devices 501 and 502.

The digital communication management platform running in the cloud environment receives messages to a shared mailbox. The platform analyzes contextual data in the messages to map messages to users. The contextual data includes data within messages, such as matter numbers, client names, codes, a source address from which the message originated, and attached documents. The contextual data includes data also includes metadata associated with the messages, that does not appear in a message header, a To field, a From field, a Subject field, or a body of the message.

Based on the contextual information, the platform maps messages to particular users. In the example illustrated in FIG. 5A, the system maps messages 507-511 to a user "Phillip," messages 509, 510, and 512-514 to a user "Erica," and messages 515 and 516 to "All Users." The platform generates a first window 504 associated with the user "Phillip" to present the messages 507-511. The platform generates a second window 505 associated with the user "Erica" to present the messages 509, 510, and 512-514. The platform generates a third window 506 associated with "All Users" to present the messages 515 and 516. While the example in FIG. 5A illustrates distinct windows associated with different users or sets of users, the platform may sort messages by user using spacing, shading, a header (e.g., a header with a user's name followed by messages mapped to the user), and distinct regions for each user.

Referring to FIG. 5B, according to one example embodiment, the system selectively displays messages in a shared mailbox based on user access authorization. When the system detects that the user, Phillip, has logged in to the message management application on the client device 501, the system determines that the user "Phillip" does not have authorization to view messages mapped to another user, Erica. Accordingly, the system displays the messages 507-511 mapped to the user "Phillip" and the messages 515 and 516 mapped to "All Users" and hides the messages associated with the user, Erica.

FIG. 6 illustrates an example embodiment in which clients 601 and 602 are computing devices—such as portable computing devices or personal computers—that access a digital communication management platform to view, read, and generate messages in a shared mailbox. Window 603 represents a GUI displayed by the client devices 601 and 602. The window 603 includes a sorting field 604 with selectable icons for sorting messages by date, by user (to which messages are mapped) by priority, and alphabetically.

The window 603 includes a column 606 identifying users to which particular messages are mapped. The column 606 may be represented as tags associated with the messages, or as fields in a table, for example. The column 606 includes a header 605 identifying the type of column as a list of users mapped to messages 607-618, respectively. For example, the column 606 indicates messages 607, 609, 612, and 618 are mapped to a user, Phillip, based on contextual data, such as metadata or data within the messages. The column 606 indicates messages 610, 611, and 613 are mapped to another user, Erica. The column 606 indicates messages 616 and 617 are mapped to another user, Chris. The column 606 indicates messages 608, 614, and 615 are mapped to "All" users.

In the example embodiment illustrated in FIG. 6, the system displays for each user the messages in a shared mailbox mapped to each other user. In addition, messages mapped to different users may be interspersed with each other in a GUI. The system tags messages with user names based on the mapping of users to messages. In some embodiments, users may access, view, and respond to messages of other users. In other embodiments, the system may restrict the viewing and/or response to messages to only the users to which the messages are mapped. In still further embodiments, the system may permit a user to view, respond to, and or delete messages mapped to other users based on determining the user has a sufficient authorization level.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein for managing the transmission of digital messages via a proxy mailbox are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
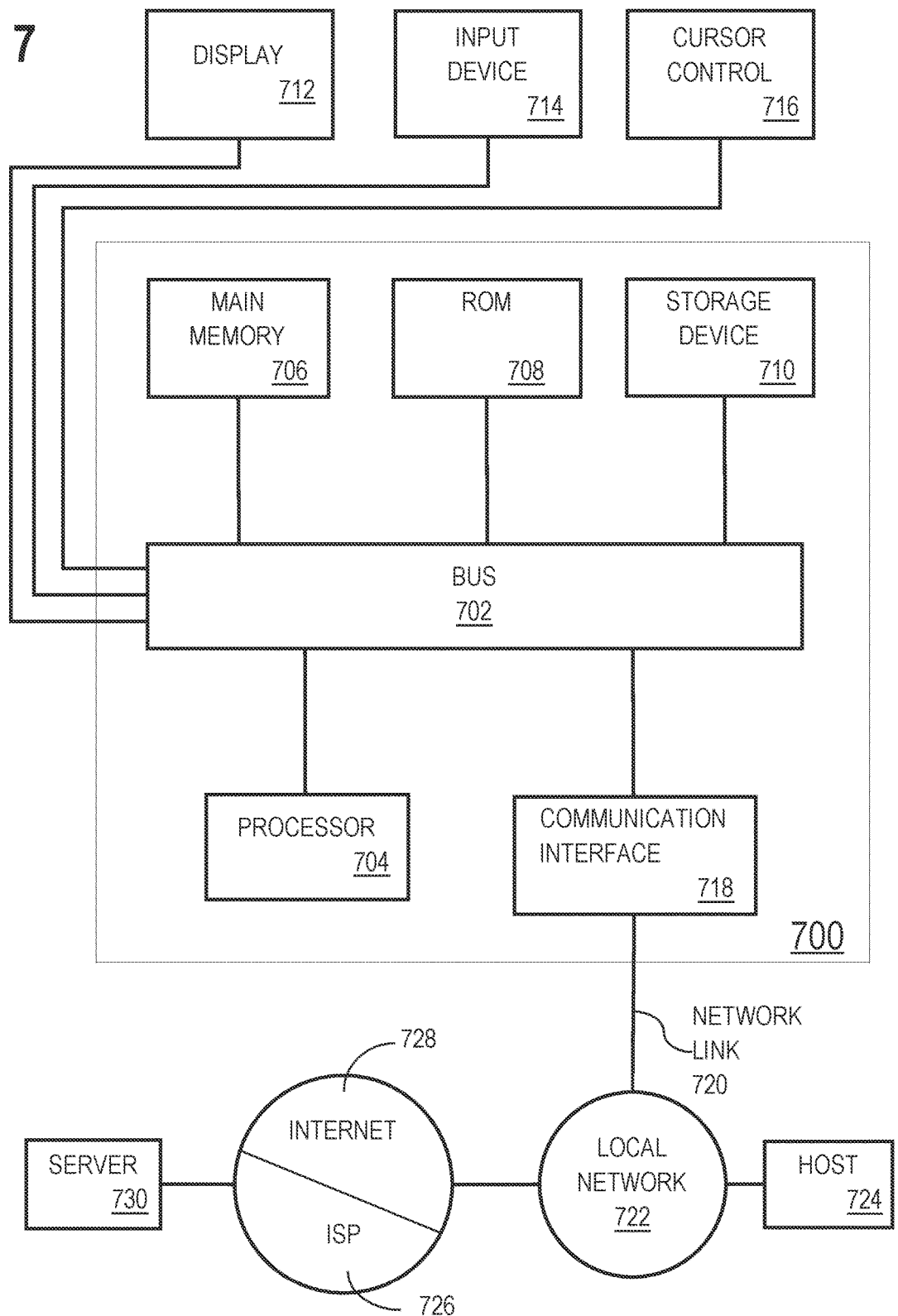
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   receiving, by a digital message management application, a first message directed to a first address corresponding to a shared mailbox;
   analyzing, by the digital message management application, the first message to identify a first correlation between the first message and a first user, wherein an identity of the first user is not specified in the first message;
   storing (a) the first message in the shared mailbox and (b) the first correlation between the first message and the first user;
   responsive to receiving a first request from the first user to access the shared mailbox and based on the first correlation between the first message and the first user, displaying a first representation of the shared mailbox, the first representation of the shared mailbox including:
   the first message, stored in the shared mailbox, that has been correlated with the first user via the first correlation; and
   a first visual indication representing the first correlation between the first message and the first user;
   receiving, by the digital message management application, a second message directed to the first address corresponding to the shared mailbox;
   analyzing, by the digital message management application, the second message to identify a second correlation between the second message and a second user, wherein the second user is not specified in the second message;
   storing (a) the second message in the shared mailbox that is also storing the first message and (b) the second correlation between the second message and the second user;
   responsive to receiving a second request from the second user to access the shared mailbox, and based on the second correlation between the second message and the second user, displaying a second representation of the shared mailbox, the second representation of the shared mailbox including:
   the second message that has been correlated with the second user via the second correlation; and a second visual indication representing the second correlation between the second message and the second user.

2. The non-transitory computer readable medium of claim 1, wherein analyzing the first message to identify the first correlation between the first message and the first user includes analyzing metadata in the first message, the metadata including information identifying the first user.

3. The non-transitory computer readable medium of claim 1, wherein analyzing the first message to identify the first correlation between the first message and the first user includes analyzing content of at least one of a header of the first message and a body of the first message to identify particular content;
   identifying the first correlation between the first message and the first user based on a mapping of the particular content to the first user.

4. The non-transitory computer readable medium of claim 3, wherein the particular content includes a matter identifier.

5. The non-transitory computer readable medium of claim 1, wherein displaying the first representation of the shared mailbox, including the first message a and the first visual indication associating the first message to the first user comprises:
   displaying the shared mailbox including a first set of messages, including the first message, mapped to the first user and a second set of messages, including the second message, mapped to the second user;
   for each message in the first set of messages, displaying a first tag identifying the first user; and
   for each message in the second set of messages, displaying a second tag identifying the second user.

6. The non-transitory computer readable medium of claim 1, wherein displaying the first representation of the shared mailbox, including the first message and the first visual indication associating the first message to the first user comprises:

displaying the shared mailbox including a first set of messages, including the first message, mapped to the first user and a second set of messages mapped to second user;

displaying the first set of messages in a first region of a graphical user interface and a first tag identifying the first user; and displaying the second set of messages in a second region of the graphical user interface, and a second identifying the second user.

7. The non-transitory computer readable medium of claim 1, wherein displaying the first representation of the shared mailbox, including the first message and the first visual indication associating the first message to the first user comprises:

detecting a request by a client application to display the shared mailbox;

responsive to detecting the request, determining the first user is logged in to the client application;

responsive to determining the first user is logged in to the client application:

displaying, in the client application, a first set of messages, including the first message, mapped to the first user; and refraining from displaying in the client application a second set of messages mapped to the second user with access to the shared mailbox.

8. The non-transitory computer readable medium of claim 1, wherein displaying the first representation of the shared mailbox, including the first message and the first visual indication associating the first message to the first user comprises:

displaying the shared mailbox including a first set of messages, including the first message, mapped to the first user and a second set of messages, including the second message, mapped to the second user;

displaying the first set of messages in a first region of a graphical user interface and a first tag identifying the first user; and responsive to determining that an authorization level of the first user does not meet a first threshold: refraining from displaying the second set of messages in the shared mailbox mapped to the second user with access to the shared mailbox.

9. The non-transitory computer readable medium of claim 8, wherein the operations further comprise:

responsive to determining that an authorization level of the first user does meet a second threshold: displaying a third set of messages in the shared mailbox mapped to one or more third users with access to the shared mailbox.

10. The non-transitory computer readable medium of claim 1, wherein the operations further comprise:

responsive to (a) receiving a request by the first user to access the shared mailbox, and (b) identifying the first correlation between the first message and the first user: displaying the first representation of the shared mailbox, including the second message and a third visual indication mapping the second message to the second user.

11. The non-transitory computer readable medium of claim 1, wherein the operations further comprise:

receiving, by the digital message management application, a third message directed to the first address corresponding to the shared mailbox; and responsive to determining that the third message meets a forwarding criteria for forwarding the third message to a second address associated with the first user: forwarding the third message to the second address.

12. The non-transitory computer readable medium of claim 1, wherein the operations further comprise:

generating a third message to a second address associated with the first user to notify the first user of the first message in the shared mailbox, wherein the first message corresponds to a first type of digital communication, and the third message corresponds to a second type of digital communication different from the first type of digital communication.

13. The non-transitory computer readable medium of claim 1, wherein the operations further comprise:

storing an association between the first message and the first user based on analyzing the first message to identify the first correlation between the first message and the first user, wherein displaying the first representation of the shared mailbox responsive to identifying the first correlation comprises:

displaying the first representation of the shared mailbox responsive to determining, based on the stored association, that the first message is correlated to the first user.

14. The non-transitory computer readable medium of claim 1, wherein the first representation of the shared mailbox that is displayed excludes any display of the second message, based at least in part on determining that the second message is not correlated to the first user.

15. The non-transitory computer readable medium of claim 1, wherein the first message omits an address of the first user from a first field of the first message that specifies recipients of the first message.

16. The non-transitory computer readable medium of claim 1, wherein analyzing the first message to identify the first correlation between the first message and the first user includes identifying the first correlation between a sender of the first message and the first user.

17. The non-transitory computer readable medium of claim 1, wherein the first visual indication identifies the first user as a recipient or an intended recipient of the first message.

18. The non-transitory computer readable medium of claim 1, wherein the first representation of the shared mailbox further includes the second message that has been correlated with the second user via the second correlation, and wherein the second representation of the shared mailbox further includes the first message that has been correlated with the first user via the first correlation.

19. A method comprising:

receiving, by a digital message management application, a first message directed to a first address corresponding to a shared mailbox;

analyzing, by the digital message management application, the first message to identify a first correlation between the first message and a first user, wherein an identity of the first user is not specified in the first message;

storing (a) the first message in the shared mailbox and (b) the first correlation between the first message and the first user;

responsive to receiving a first request from the first user to access the shared mailbox and based on the first correlation between the first message and the first user, displaying a first representation of the shared mailbox, the first representation of the shared mailbox including:
  the first message, stored in the shared mailbox, that has been correlated with the first user via the first correlation; and
  a first visual indication representing the first correlation between the first message and the first user;
receiving, by the digital message management application, a second message directed to the first address corresponding to the shared mailbox;
analyzing, by the digital message management application, the second message to identify a second correlation between the second message and a second user, wherein the second user is not specified in the second message;
storing (a) the second message in the shared mailbox that is also storing the first message and (b) the second correlation between the second message and the second user;
responsive to receiving a second request from the second user to access the shared mailbox, and based on the second correlation between the second message and the first second user, displaying a second representation of the shared mailbox, the second representation of the shared mailbox including:
  the second message that has been correlated with the second user via the second correlation; and a second visual indication representing the second correlation between the second message and the second user.

20. The non-transitory computer readable medium of claim 1, wherein analyzing the first message to identify the first correlation between the first message and the first user includes identifying the first correlation between a sender of the first message and the first user.

21. The method of claim 19, wherein analyzing the first message to identify the first correlation between the first message and the first user includes analyzing content of at least one of a header of the first message and a body of the first message to identify particular content;
  identifying the correlation between the first message and the first user based on a mapping of the particular content to the first user.

22. The method of claim 21, wherein the particular content is one of a matter identifier and a sender of the first message to the shared mailbox.

23. The method of claim 19, wherein displaying the first representation of the shared mailbox, including the first message and the first Visual indication associating the first message to the first user comprises:
  displaying the shared mailbox including a first set of messages, including the first message, mapped to the first user and a second set of messages, including the second message, mapped to the second user;
  for each message in the first set of messages, displaying a first tag identifying the first user; and
  for each message in the second set of messages, displaying a second tag identifying the second user.

24. A system comprising:
one or more processors; and
memory storing instructions that, when executed by the one or more processors, cause the system to perform operations comprising:
receiving, by a digital message management application, a first message directed to a first address corresponding to a shared mailbox;
analyzing, by the digital message management application, the first message to identify a first correlation between the first message and a first user, wherein an identity of the first user is not specified in the first message;
storing (a) the first message in the shared mailbox and (b) the first correlation between the first message and the first user;
responsive to receiving a first request from the first user to access the shared mailbox and based on the first correlation between the first message and the first user, displaying a first representation of the shared mailbox, the first representation of the shared mailbox including:
  the first message, stored in the shared mailbox, that has been correlated with the first user via the first correlation; and
  a first visual indication representing the first correlation between the first message and the first user;
receiving, by the digital message management application, a second message directed to the first address corresponding to the shared mailbox;
analyzing, by the digital message management application, the second message to identify a second correlation between the second message and a second user, wherein the second user is not specified in the second message;
storing (a) the second message in the shared mailbox that is also storing the first message and (b) the second correlation between the second message and the second user;
responsive to receiving a second request from the second user to access the shared mailbox, and based on the second correlation between the second message and the second user, displaying a second representation of the shared mailbox, the second representation of the shared mailbox including:
the second message that has been correlated with the second user Via the second correlation; and
  a second Visual indication representing the second correlation between the second message and the second user.

\* \* \* \* \*